United States Patent [19]

Powell

[11] Patent Number: 4,648,023

[45] Date of Patent: Mar. 3, 1987

[54] METHOD FOR RESOURCE ALLOCATION FOR THE MANUFACTURE OF A PRODUCT

[76] Inventor: Roger A. Powell, 1589 Vernon Rd., Norristown, Pa. 19401

[21] Appl. No.: 869,450

[22] Filed: May 27, 1986

Related U.S. Application Data

[63] Continuation-in-part of Ser. No. 737,145, May 23, 1985, abandoned.

[51] Int. Cl.[4] .............................................. G06F 15/00
[52] U.S. Cl. ..................................... 364/156; 364/401
[58] Field of Search ............... 364/148, 150, 153, 154, 364/155, 156, 401, 402, 200, 900

[56] References Cited

U.S. PATENT DOCUMENTS

| | | | |
|---|---|---|---|
| 3,703,725 | 11/1972 | Gomersall | 444/1 |
| 3,845,286 | 10/1974 | Aronstein | 444/1 |
| 4,089,056 | 5/1978 | Barna | 364/551 |
| 4,208,712 | 6/1980 | Deutsch | 364/500 |
| 4,517,637 | 5/1985 | Cassell | 364/138 |

*Primary Examiner*—Jerry Smith
*Assistant Examiner*—Allen MacDonald

[57] ABSTRACT

A control system for the manufacture of small-order-quantity goods. A network of events, activities and baseline schedule dates is constructed. Availability of external components and actual internal progress are measured by a slack variable. Optimization is based on use of the slack variable for allocation of resources. Critical items are determined rapidly and in parallel. Cost estimation of schedule improvements are readily determined.

11 Claims, 3 Drawing Figures

METHOD FOR RESOURCE ALLOCATION FOR THE MANUFACTURE OF A PRODUCT

This is a continuation-in-part of Ser. No. 737,145 filed May 23, 1985, and now abandoned.

BACKGROUND OF THE INVENTION

This invention is directed to a control system for a complete manufacturing system for small-order-quantity, complex goods. The control system of this invention has the capability of rapid information processing and display, minimization of manufacturing cycle time, efficient allocation of resources, and minimized excess costs.

Although the invention has general application to a wide range of manufacturing systems, it will be illustratively described with specific reference to the manufacture of gearboxes.

In the manufacture of small-order-quantity, complex goods such as gearboxes, the work effort is a sequence of machining and assembly operations. The proper control of these operations is as important to the efficient transformation of the raw steel into the finished gearbox as each machining operation itself. Just as an improvement in the cutting method of the gears can produce faster, lower-cost production, an improvement in the control of manufacturing operations can produce a similar reduction in total cost and the elapsed time of production.

For example, in U.S. Pat. No. 3,703,725, the method of control uses a computer to balance work flow rates in a manufacturing process. In U.S. Pat. No. 3,845,286, a control system sequences semi-conductor wafers through a number of work stations. In U.S. Pat. No. 4,027,246, a central computer controls the transfer and processing of semi-conductor wafers. Although these inventions teach a means for manufacturing control, and an improvement in efficiency, they do not teach a means to maximize manufacturing efficiency and thereby minimize manufacturing costs.

In the manufacture of complex, small-order-quantity goods, the costs of idle waiting time, penalties due to late delivery, unjustified expediting costs, and excessive inventories must be minimized.

One system that has addressed this problem is the critical path method (CPM), in which a network of activities is created that shows the sequence of operations and the interdependencies of the particular manufacturing process. A variation of this basic method is PERT (Project Evaluation and Review Technique) which uses multiple estimates to provide a probabilistic output. These systems are frequently computerized and searched to find the critical item; i.e., the item that is, in effect, the latest, and which determines the final completion date.

The major problem with these systems is that critical items must be searched serially; each requiring a computer run, at a considerable expense in large projects. Further, for every change in the availability date of any item, the impact on the final completion date can only be assessed by another computer run. In general, these systems do not provide an easy and timely visability into the critical items and their degree of impact. Also, these systems do not offer a means to balance resources in order to minimize the costs of the project.

OBJECTIVES OF THE INVENTION

One object of this invention is to provide a control system for small-order-quantity manufacturing that provides a means to search the manufacturing process in parallel for critical items and to order those items by their degree of criticality. Another object is to provide a control system for product manufacture that provides real-time responses to inquiries about the impact of changes in the availability of an item. Another object is to provide a manufacturing control system that establishes a method of allocating resources to provide the optimal distribution of those resources. Another object is to provide a means to monitor the progress of a manufacturing operation.

SUMMARY OF THE INVENTION

This manufacturing control system establishes a network of manufacturing activities, assigns time duration estimates to each activity, and establishes baseline schedule dates for the start and completion of each activity. This baseline schedule data set is then used as a constant reference against which all supporting external component availabilities and actual progress is measured. The principle control variable is a measure of the deviation from the baseline data set and is called slack. This slack variable is used to determine the projected final completion date, allocate resources, and order queues.

A BRIEF DESCRIPTION OF THE DRAWINGS

DETAILED DESCRIPTION OF THE PREFERRED EMBODIMENT

To facilitate the description of the invention, it is worthwhile to define some conventions solely for this purpose. These conventions are somewhat arbitrary and should not be construed as limiting to the generality of the invention. For the purpose of this description:

(a) Time is measured in working days
(b) Each working day is assigned a sequential number called the "date" representing calendar date or point in time; the number increases with later calendar dates.
(c) Slack is defined as the requirement date minus the availability date; therefore, if the requirement date is later in time (a higher number) than the availability date (a lower number) the slack is positive.
(d) Least slack is defined in the algebraic sense, meaning the most negative amount; e.g., negative 6 (−6) is less than positive 4 (+4).

The product that is manufactured in the preferred embodiment of the control system invention is mechanical gearboxes. This control system invention is applicable to an enormous range of manufactured products and the use of gearboxes in this embodiment should not be construed as limiting.

Figure 1:
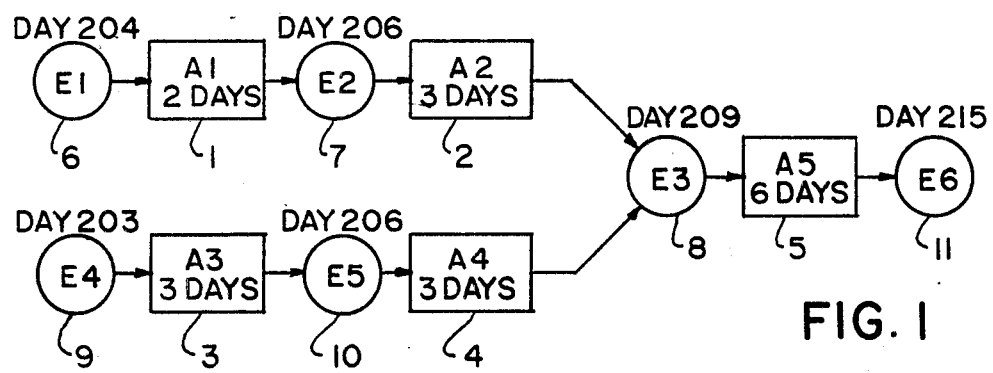
FIG. 1 shows a typical network of events and activities that describe the manufacture of a product.

In FIG. 1, in the manufacture of gearboxes, particularly those of small-order-quantity, produced on a jobshop rather than a continuous assembly line basis, the time-consuming manufacturing operations such as gear cutting, gear hobbing, gear grinding, etc., may be defined as activities, 1, 2, 3, 4, 5, and each one identified by the letter "A" and a numerical suffix; e.g., "A1", A2", A3". At the beginning and end of each activity, 1, 2, 3, 4, 5, there exists a condition of state which occurs at a moment in time and which are defined as events 6, 7, 8, 9, 10, 11; e.g., "Activity A1 completed, Activity A2 ready to begin". Events, 6, 7, 8, 9, 10, 11, are identified by the letter "E" and a numeric suffix; e.g., "E1", "E2", "E3".

FIG. 1 shows network of activities, 1, 2, 3, 4, 5, and events, 6, 7, 8, 9, 10, 11, flowing from left to right. The interconnecting arrows show the direction of time and material flow and the independencies between activities, 1, 2, 3, 4, 5, and events, 6, 7, 8, 9, 10, 11. For example, Activity A5, 5, cannot begin until event E3, 8, as occurred, which is "Activity A2 complete, Activity A4 complete, Activity A5 ready to begin". Within each activity block, 1, 2, 3, 4, 5, has also been added the estimated time duration of the activity. This estimate includes time waiting in queue, machine time, and time to transport to the next workstation. The foregoing parallels the Critical Path Method (CPM) of network analysis. A network such as that in FIG. 1 is generated for all the manufacturing steps that are to be controlled by the subject invention. Typically, this is done by the production control personnel and will include all of the manufacturing steps (such as gear cutting, gear hobbing, gear grinding) for all the components required in the complete assembly. The production control personnel will also identify the purchased material required at each event, 6, 7, 8, 9, 10, 11, to support the next activity, 1, 2, 3, 4, 5; e.g., gear blanks, gear case castings, fasteners, bearings, paint, etc. This identification task is the same as that normally performed by the production control personnel in many existing manual systems of control.

The next step is the assignment of dates to each event. The desired final completion date is assigned to the final completion event, E6, 11 in FIG. 1. In this example, "day 215" is used. The remaining events are assigned their dates by moving from right to left (backward with respect to time) and subtracting the time duration estimate of the intervening activity from the prior determined date. For example, the date for E3, 8, equals the date for E6, 11, less the duration of A5, 5; i.e., day 209 equals day 215 less 6 days. The result shown in FIG. 1 is the baseline schedule. This step may be performed manually or automatically on a digital computer.

The network shown in FIG. 1 has no slack (or waiting) time within the flow. Therefore, the time duration between any two points on any path through the network will be equal to the sum of the time durations of the activities included in the subject path. this is a major difference with the Critical Path Method (CPM) and with PERT, both of which typically have embedded slack time in their networks.

Figure 2:
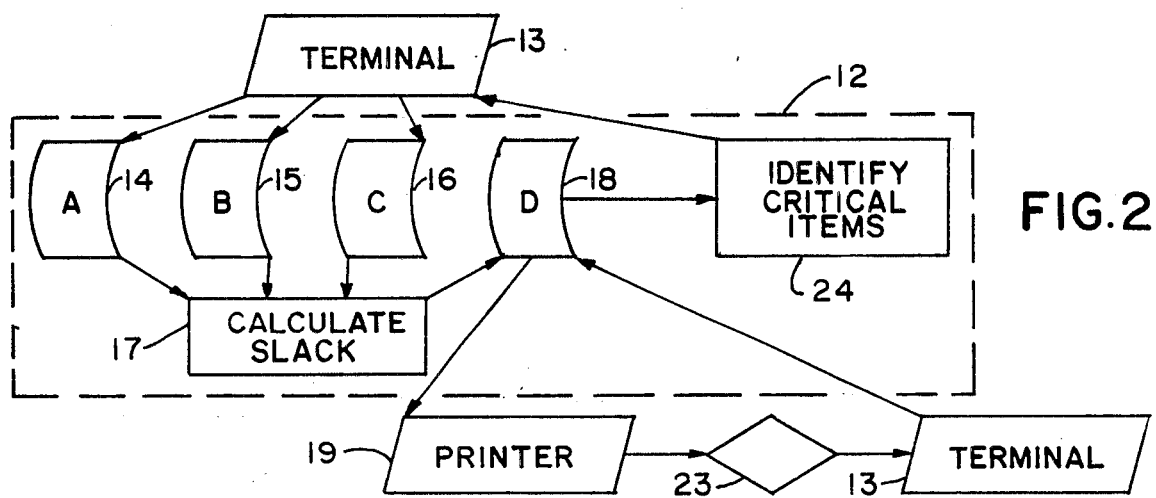
FIG. 2 shows a schematic of the control system for external components.

The information from the baseline schedule in the form of each event and its associated schedule date is loaded via a terminal, 13, into memory field A, 14, in the control computer, 12, in FIG. 2.

At this point it is beneficial to describe the control system in two parts: the first being the control of external components and the second (to be described later) being the control of internal operations. An external component is an item that has not entered the network yet.

The information prepared by the production control personnel linking each required external component with an event is loaded via a terminal 13 into memory field B, 15, in the control computer, 12. Each external component is assigned a unique number for identification purposes. The estimated availability date for each external component is loaded via a terminal, 13, into memory field C, 16, in the central computer, 12. Using pre-programmed instructions, the external slack calculator, 17, in the control computer, 12, serially retrieves each external component and its associated event from memory field B, 15, retrieves the baseline schedule date associated with that event from memory field A, 14, and retrieves the external component's availability date from memory field C, 16. The external slack calculator, 17, then subtracts the availability date from the baseline schedule date and defines the result as the "external slack variable" for that external component. The external slack variable associated with each external component, its event, baseline schedule date, and availability date are transmitted and stored in memory field D, 18, in the control computer, 12.

When the external slack variable for each of external components has been calculated and stored, the control computer, 12, prints out the collected and calculated data from memory field D, 18, on printer 19. An example printout is simulated in Table 1. Column 1 is the identification number of each external component. Column 2 is the first event at which the external component is required. At all subsequent events, it is an internal item and controlled by a method to be explained later. Column 3 is the baseline schedule date associated with the event in Column 2. Column 4 is the availability date associated with the external component in Column 1. Column 5 is the external slack variable which is equal to the date in Column 3 minus the date in Column 4. The last columns are a graphical representation of the slack variable in Column 5.

The final completion date will be determined by the external component that has the least slack value and by an amount equal to that component's slack value. In the Table 1 example, external component 91005 will pace the final completion date since it has the least slack value of −2. External component 91005 has the most late availability with respect to its baseline schedule date. The final completion date will be two days late (−2 days of slack) due to this component. Using this control system, the critical component and the component's impact on final completion date are immediately determined. In order to improve the final completion date, only resources concentrated on the critical component (91005) will have an impact on the final completion date. The rest of the components will not have any effect on the final completion date as long as their slack values are not the least. Therefore, the slack values of the non-critical components can decrease within this limitation without producing any schedule impact. When management personnel review the information shown in Table 1, they can readily determine the impact of each external component upon the final completion date and they can predict the final completion date based on the item with the least slack. If this slack is negative, the final completion will be late. Management personnel must determine if the lateness and the degree of lateness are acceptable, and, if not, what degree of lateness is acceptable. This is translated into a slack value; e.g., negative one (−1), and is called the "project external slack". This management decision process, 23, is shown in FIG. 2. This information is transmitted via terminal, 13, to memory field D, 18, in the control computer, 12.

This is the value that all external component slack variables will be measured against. Any external component, with a slack variable less than the project external slack variable must have its slack increased to be at lease equal to the project external slack value. This can be done by improving the component's availability date or rescheduling its requirement data to be later in time. Then a subroutine, 24, in the control computer, 12, searches memory field D, 18, and identifies the external components with slack variables less than the project external slack. These components are critical and their availabilities must be improved by the allocation of additional resources so that their new slack variables are greater to or equal to the project external slack variable.

The external project slack value and the critical components listing are transmitted to production control personnel, via a terminal, 13, with the instruction to concentrate on improving the availabilities on the listed items in order to satisfy the project external slack value. As availability dates are revised, they are transmitted via terminal, 13, by production control personnel to memory field C, 16, in the control computer, 12. The external slack calculator, 17, will calculate the new slack variable and update memory field D, 18, and periodically present the results to management personnel via a printer, 19, for reconsideration of the project external slack variable decision, 23.

Since these functions are so simple and straightforward, the control computer, 12, can quickly determine the new external slack variable based on a component's new availability, compare it to the project external slack, determine its criticality and respond to the production control personnel via the terminal, 13, within a few seconds. This allows the production control personnel to take immediate action if the subject component is reported critical.

Figure 3:
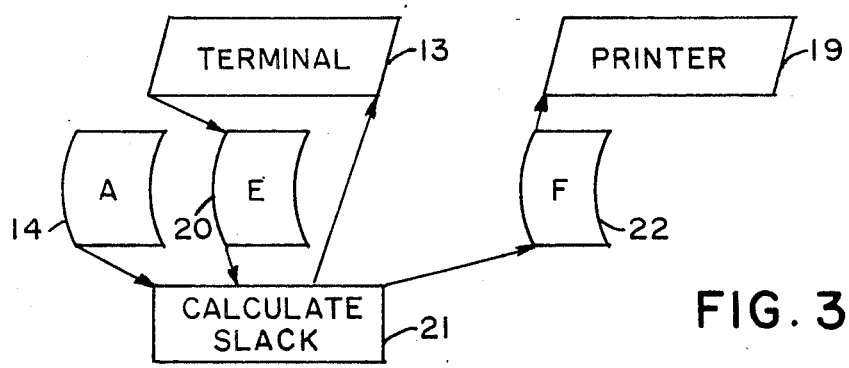
FIG. 3 shows a schematic of the control system for internal operations.

The second portion of the control system controls the internal operations. After an external component enters the system, its progress through the network is monitored at each work station and it is termed an internal component. When an activity is complete, the internal component is sent to its next activity. When it arrives at the next activity workstation, it is checked against the list of components (internal and external) required for the next activity. When all of the necessary components have arrived at the workstation, they are placed at the end of the work queue, and the event preceeding the activity that is to take place at the workstation is considered to have occurred. As shown in FIG. 3, at least once per day, all events that have occurred in the queue for each workstation are identified and transmitted via a computer terminal, 13, to memory field E, 20, in the control computer, 12, along with the present date. For each event, the event slack calculator, 21, in the control computer, 12, retrieves the schedule date for its event from memory field A, 14, (previously loaded for external components), and calculates the internal slack variable which is equal to the schedule date minus the present date. The internal slack calculator then arranges the events for each workstation in the order of increasing slack and transmits this listing to the terminal, 13, for the subject workstation. The workstation personnel can now order the queue with respect to increasing slack from the list. Therefore, those events with the least slack (and therefore most critical) are at the head of the queue. The event slack calculator also directs the event slack to memory field F, 22, where is accumulated and at least one per day printed on the printer, 19, for review by management personnel.

Management personnel have received the external slack information and the event slack information from the control computer, 12. The final completion date will be determined by the external components or events with the least slack. Management personnel may allocate additional resources to improve the slack of the critical and near critical external components or internal events (by expediting activities to minimize their durations). The cost of these additional resources must be justified based on avoiding penalty costs for late completion or gaining additional revenue for early completion. To aid management personnel in this process, the cost of availability improvement can be calculated. For each of the most critical external components and internal events, the costs for availability improvement per day are estimated. These costs are shown graphically in Table 2 for external components. The costs for internal events would be shown in a similar manner.

Table 2, Column 1 identifies the external component by number. Since it is only necessary to concentrate on the items with the least slack, the components from Table 1 with slack of +2 or greater are not shown. Column 2 shows the event that the external component is required to support. Column 3 shows the present slack value. The next 5 columns graphically show the cost to improve a component's availability. For example, component 91001 requires $200 for each day of improvement in its availability. It now has a slack value of −1. To improve its availability three days to a slack value of +2, will cost $600.

On the bottom row of the table is accumulated the network cost of schedule improvement (increased slack). The accumulation is computed by starting at the right-most column, and moving to the left, summing the entries in each column with the entries from all columns to the right, and entering the accumulated total under the subject column. In this example, the cost to improve the final completion date by 1 through 4 days (change the slack to −1, 0, +1, +2, respectively) is $200, $600, $5000, and $9600 respectively. These additional costs can be compared to the external costs of a delay in the final completion date, and a determination can be made if the additional internal costs are justified. Management personnel can adjust the project slack variable accordingly.

The control of internal events can also utilize project event slack variable that would be determined by management personnel and operate in a manner similar to the project external slack variable used to control external components. The structure of the computerization may be changed to use a number of small personal computers, each used by an individual responsible for the control of several events, since this control system may be readily modularized. A minimum of communication is required between the personal computers and management personnel: the external components and events with the least slack and their associated availability improvement costs must be transmitted to management personnel, and, after aggregating the data from all the personal computers and reviewing it, management personnel must respond with the project external slack variable and a project event slack variable (if used). In similar manner, a very large project extending over many companies, can use this control system. Each company would be analogous to the individual with the personal computer, transmitting critical component slack information to a central management and recieving project timing directions via project slack variable information from the central management.

While the invention has been particularly shown and described in reference to a preferred embodiment thereof, it will be understood by those skilled in the art that the foregoing and other changes in form and detail may be made therein without departing from the spirit and scope of the invention.

TABLE 1

| Item No. | Event No. | Baseline Schedule Date | Estimated Avail. Date | Slack | +5 | +4 | +3 | +2 | +1 | 0 | −1 | −2 |
|---|---|---|---|---|---|---|---|---|---|---|---|---|
| 91001 | E1 | 13 Oct. | 14 Oct. | −1 | | | | | | | X | |
| 91002 | E1 | 13 Oct. | 12 Oct. | +1 | | | | | X | | | |
| 91003 | E2 | 17 Oct. | 15 Oct. | +2 | | | | X | | | | |
| 91004 | E2 | 17 Oct. | 14 Oct. | +3 | | | X | | | | | |
| 91005 | E3 | 20 Oct. | 22 Oct. | −2 | | | | | | | | X |
| 91006 | E3 | 20 Oct. | 19 Oct. | +1 | | | | X | | | | |
| 91007 | E4 | 12 Oct. | 12 Oct. | 0 | | | | | | X | | |
| 91008 | E4 | 12 Oct. | 10 Oct. | +2 | | | | X | | | | |
| 91009 | E5 | 17 Oct. | 12 Oct. | +5 | X | | | | | | | |
| 91010 | E5 | 17 Oct. | 13 Oct. | +4 | | X | | | | | | |

TABLE 2

| Item No. | Event No. | Slack No. | Slack +2 | +1 | 0 | −1 | −2 | Cost to Improve Avail |
|---|---|---|---|---|---|---|---|---|
| 91001 | E1 | −1 | 200 | 200 | 200 | X | | $200/day |
| 91002 | E2 | +1 | 100 | X | | | | $100/day |
| 91005 | E3 | −2 | 200 | 200 | 200 | 200 | X | $200/day |
| 91006 | E3 | +1 | 100 | X | | | | $200/day |
| 91007 | E4 | 0 | 4000 | 4000 | X | | | $4000/day |
| Cost to improve final compl. date: | | | $9600 | $5000 | $600 | $200 | $0 | |

I claim:

1. A method for manufacturing a product, comprising:
    generating a network of activities required to manufacture said product,
    estimating a time duration for each activity,
    determining a desired final completion date for completion of said manufacturing,
    calculating a baseline schedule date for each said activity, said baseline schedule date for each prior activity being equal to the baseline schedule date for the following activity in said network minus said estimated time duration of said prior activity, said desired final completion date being the last baseline schedule date in said network,
    identifying components required to complete each said activity,
    determining an availability date for each said component,
    assigning to each component said baseline schedule date for said activity requiring said component,
    calculating a time difference between said availability date and said baseline schedule date for each component, said time difference being a measure of lateness of said availability date with respect to said baseline schedule date for each component,
    manufacturing said product, said manufacturing applying resources to transform an article from an initial state into a different final state,
    allocating said resources in said manufacturing based on said time differences, thereby refining said manufacturing step.

2. A method for manufacturing a product as recited in claim 1, wherein said resources include productive time at individual work stations, and wherein said allocating assigns priority to said components being most late as measured by said time differences.

3. A method for manufacturing a product as recited in claim 1, wherein said resources include additional reserves of manpower and machine time and wherein said allocating commits said reserves to said components being most late as measured by said time differences.

4. A method for manufacturing a product as recited in claim 1, further comprising: determining a trigger-level of lateness as measured by said time differences; comparing said time differences for each component with said trigger-level, thereby determining components having lateness exceeding said trigger-level; wherein said allocating concentrates said resources on components having lateness exceeding said trigger-level.

5. A method for manufacturing a product as recited in claim 1, further comprising: determining a set of components being most late as determined by said time differences; determining costs required to make earlier the availability date for each component in said set; summing said costs across said components in increments of degrees of lateness as measured by said time differences.

6. A method for manufacturing a product, comprising:
    generating a network of activities required to manufacture said product,
    estimating a time duration for each activity,
    determining a desired final completion date for completion of said manufacturing,
    calculating a baseline schedule date for each said activity, and baseline schedule date for each prior activity being equal to the baseline schedule date for the following activity in said network minus said estimated time duration of said prior activity, said desired final completion date being the last baseline schedule date in said network, manufacturing said product, said manufacturing applying resources to transform an article from an initial state into a different final state, determining dates of actual performance of said activities, calculating a time difference between said date of actual performance and said baseline schedule date for each activity, said time difference being a measure of lateness of said date of actual performance with respect to said baseline schedule date for each activity, allocating said resources in said manufacturing based on said time differences, thereby refining said manufacturing step.

7. A method for manufacturing a product as recited in claim 6, wherein said resources include manpower and equipment, and wherein said allocating assigns additional resources to said activities being most late as measured by said time differences.

8. A method for manufacturing a product as recited in claim 6, wherein said allocating diverts resources away from activities being least late as measured by said time differences.

9. A method for manufacturing a product, comprising:

generating a network of activities required to manufacture said product, estimating a time duration for each activity, determining a desired final completion date for completion of said manufacturing, calculating a baseline schedule date for each said activity, said baseline schedule date for each prior activity being equal to the baseline schedule date for the following activity in said network minus said estimated time duration of said prior activity, said desired final completion date being the last baseline schedule date in said network, identifying components required to complete each said activity, determining an availability date for each said component, assigning to each component said baseline schedule date for said activity requiring said component, calculating a time difference between said availability date and said baseline schedule date for each component, said time difference being a measure of lateness of said availability date with respect to said baseline schedule date for each component, manufacturing said product, said manufacturing applying resources to transform an article from an initial state into a different final state, determining dates of actual performance of said activities, calculating a time difference between said date of actual performance and said baseline schedule date for each activity, said time difference being a measure of lateness of said date of actual performance with respect to said baseline schedule date for each activity, allocating said resources in said manufacturing based on said time differences, thereby refining said manufacturing step, said allocating directing a larger share of said resources to activities and components being most late as measured by said time differences.

10. A method for manufacturing a product as recited in claim 9, further comprising: determining a set of components being most late as determined by said time differences; determining costs required to make earlier the availability date for each component in said set; summing said costs across said components in increments of degrees of lateness as measured by said time differences.

11. A method for manufacturing a product as recited in claim 9, wherein at least one calculating step is performed by a digital computer.

* * * * *